Dec. 25, 1956  V. W. PETERSON  2,775,331
CLUTCH WITH COOLANT METERING
Filed June 2, 1951

Inventor
Victor W. Peterson
By Willito, Helmig & Baillie
Attorneys

United States Patent Office 2,775,331
Patented Dec. 25, 1956

2,775,331

CLUTCH WITH COOLANT METERING

Victor W. Peterson, Indianapolis, Ind., assignor to General Motors Corporation, Detroit, Mich., a corporation of Delaware Application June 2, 1951, Serial No. 229,600

9 Claims. (Cl. 192—113)

My invention relates to friction clutches, and more particularly to provisions for cooling such clutches during the period of slip between the driving and driven members of the clutch while engaging or disengaging the clutch. In certain applications of friction clutches, particularly where a shaft rotating at high speed is to be coupled to a load of relatively high inertia, full engagement and synchronization of the driving and driven members of the clutch is effected only after a very considerable number of slip revolutions with the clutch in partial engagement. The large amount of heat generated by the friction between the slipping clutch members would destroy the clutch unless some provisions were made for cooling and, generally, lubricating the clutch plates.

This invention is directed to improvements in the cooling of clutches under such circumstances, and more particularly to a combination of means by virtue of which the amount of coolant circulated to the clutch is proportioned to the demand, and the supply of coolant is automatically terminated when the clutch ceases to slip, and may be automatically initiated at the commencement of slip upon disengagement of the clutch. More specifically, in its preferred embodiment, the invention comprises a metering device including parts rotatable with the driving and driven members of the clutch respectively, the metering device being supplied with a coolant fluid and discharging it into the clutch. The output of the metering device is proportional to the slip of the clutch; therefore, the coolant does not flow when there is no slip. In the preferred form, the metering device includes a part rotatable with one member of the clutch formed with chambers which are supplied with fluid from an external source, the filling and emptying of the chambers being controlled by valves rotatable with the other member of the clutch.

The principal objects of the invention are to improve the performance and reliability of clutches, to improve the cooling of clutches, and to provide a simple, reliable, and automatic mechanism for supplying coolant to a clutch during the slip period thereof. Other objects of the invention and the advantages thereof will be apparent to those skilled in the art from the succeeding detail description of the presently preferred embodiment of the invention.

Figure 1:
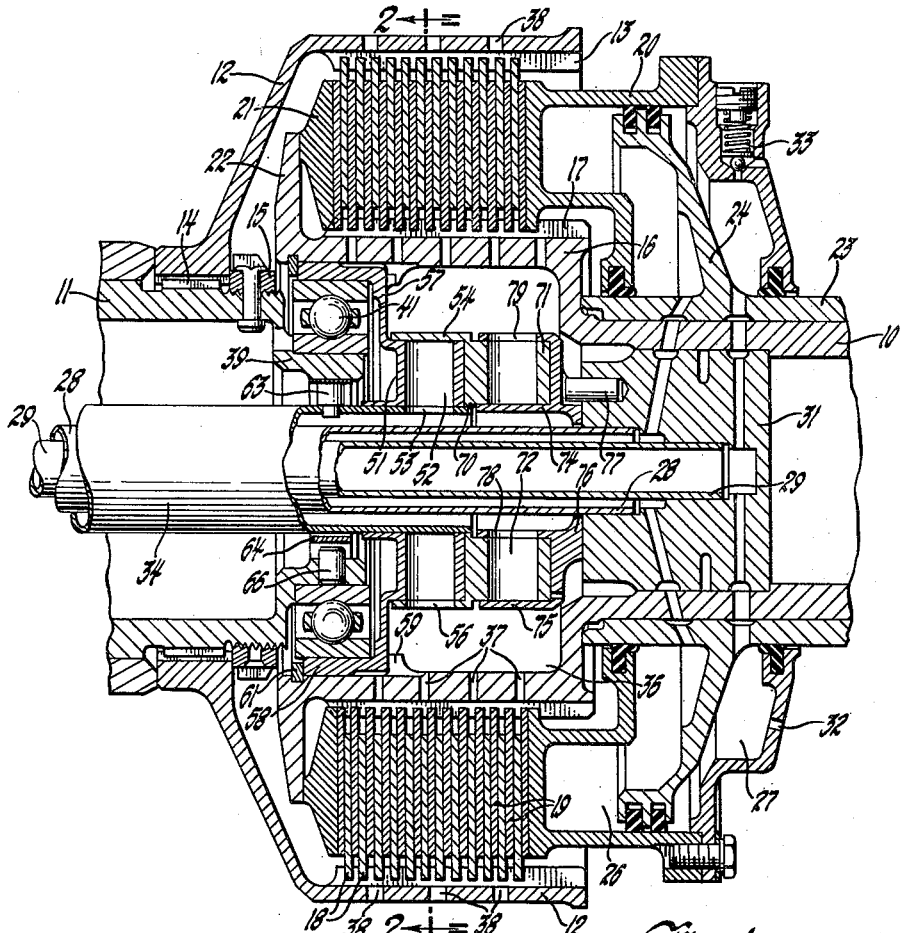
Figures 2, 3:
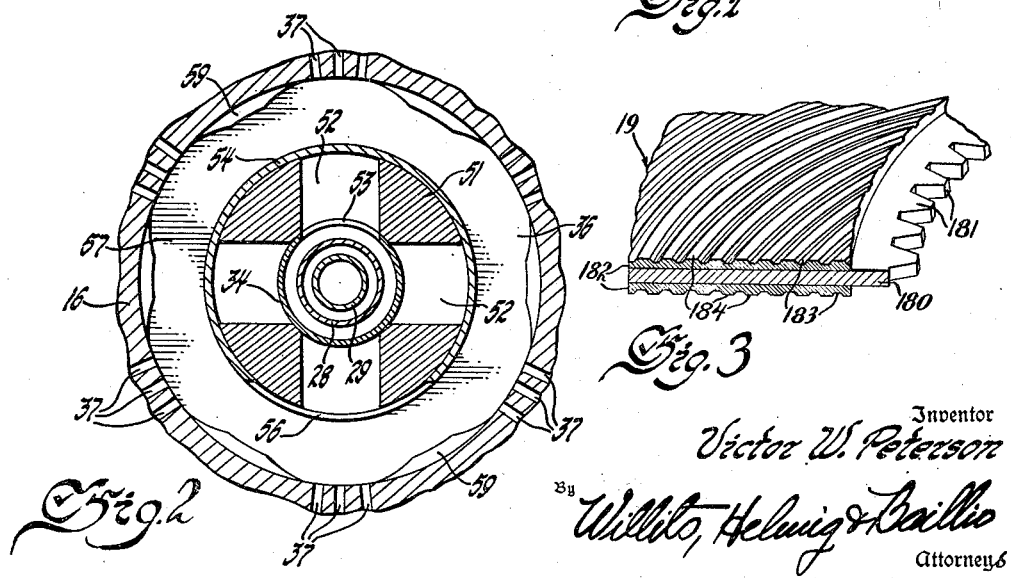

Referring to the drawings, Figure 1 is a longitudinal sectional view of a clutch incorporating the invention, Figure 2 is a partial cross-sectional view thereof taken on the plane indicated in Figure 1, and Fig. 3 is a partial perspective view of a clutch disk.

The invention as illustrated herein is incorporated in a clutch of the type disclosed in the copending applications of Victor W. Peterson and Herbert H. Schnepel, Serial No. 147,268, filed March 15, 1950 (now abandoned), and Serial No. 174,052, filed July 15, 1950, of common ownership with this application. These prior applications describe the clutch and a control system therefor in some detail. The clutch is primarily intended for use in coupling a gas turbine power unit to an aircraft propeller. In the system disclosed in these applications, a cooling and lubricating fluid is supplied to the clutch during the period of engagement under control of a valve external to the clutch. The present embodiment of the invention is adapted for incorporation in the physical clutch structure described in the copending applications, and provides an automatic metering device to regulate the flow of coolant to the clutch in accordance with the difference between the rotations of the driving and driven shafts of the clutch.

It is believed that this specification describes the clutch sufficiently for an understanding of the invention to which this application is directed, but note may be taken of the prior applications which describe the clutch and its environment more fully.

Referring to Figure 1, the clutch is adapted to couple a shaft 10 to a shaft 11. For clarity, the shaft 10 will be referred to as the driving shaft and shaft 11 as the driven shaft, but either shaft may be the driving shaft. The driven member 12 of the clutch is in the form of a drum provided with internal splines 13 and is formed with a flange splined to the shaft 11 at 14 and retained against an abutment on the shaft by a threaded ring 15. The shaft 10 is formed with enlarged end portion or driving clutch drum 16 provided with external splines 17. A number of annular driven clutch plates 18 are formed with peripheral notches which engage the splines 13 of the driven clutch drum 12. Driving clutch plates 19, which are interleaved with the driven plates, are formed to engage the splines 17 of the driving clutch drum.

For engagement of the clutch the plates are pressed together by an annular cylinder 20 movable axially with respect to the shaft 10. The thrust of the cylinder 20 is absorbed by a backing ring 21 engaging a flange 22 on the drum 16. The cylinder 20 slides on a sleeve 23 fixed on the shaft 10, the sleeve 23 being integral with a web 24 which constitutes an annular piston. This piston divides the cylinder 20 into two chambers 26 and 27. By admitting fluid under pressure to the chamber 26, the clutch is engaged, and by supplying fluid under pressure to the chamber 27 the cylinder 20 is moved to disengage the clutch. The clutch actuating fluid, which is preferably oil, is supplied to the chambers 26 and 27 through concentric tubes 28 and 29 disposed on the axis of the clutch, radial passages in a fitting 31 pressed into the shaft, and radial passages through the shaft 10 and sleeve 23 into the chambers 26 and 27. Fluid under pressure may be supplied to the tubes 28 and 29 from any suitable source by any suitable valve mechanism. The chamber 27 is provided with a bleed opening 32 and a centrifugal bleed valve 33 to release some of the fluid from the disengaging chamber 27 so that the centrifugal effect of fluid in this chamber tending to release the clutch is reduced, as is explained more fully in the abovementioned applications.

Fluid, preferably oil, for cooling and lubricating the clutch plates is supplied through a tube 34 which surrounds the tube 28 and extends into a chamber 36 within the driving clutch drum 16. This clutch drum is formed with a number of radial passages 37 by which oil flows under the influence of static pressure or centrifugal force to the clutch plates. The clutch plates are relieved, as described in the said prior applications, to provide passages through which the coolant flows between the clutch plates to the drum 12, from which it is discharged through ports 38.

The shaft 11 is formed with a reduced end portion 39 on which is mounted a ball bearing 41 by which the driven shaft 11 is piloted in the driving clutch drum 16.

In the structure disclosed in the said prior applications, coolant discharged from the tube 34 flowed directly through the chamber 36 and passages 37 into the clutch. Control of the flow of coolant was provided exclusively by an external valve controlling the supply to the tube 34. In the present structure, a metering device is mounted within the chamber 36. The principle of the metering device may be most readily understood by reference to Figure 2. An annular body 51 with cylindrical inner and outer surfaces is formed with chambers or passages 52 extending radially from the inner to the outer surface of the body. The body 51 rotates with the driving clutch drum 16. The coolant tube 34, which rotates with the driven shaft 11, fits rotatably within the inner surface of the body 51 and is formed with a radial discharge port 53. An outer sleeve 54 which also rotates with the driven shaft 11 and tube 34 engages the cylindical outer surface of the body 51. The sleeve 54 is formed with a discharge port 56 disposed diametrically opposite the inlet port 53 in the tube 34. The ports 53 and 56 are of such circumferential extent that they register alternately with the chambers 52 in the body 51; thus, as the tube 34 rotates relatively to the body 51, the chambers 52 are filled in succession through the port 53. After each chamber has rotated sufficiently with respect to the port 53 that the inlet is cut off, the chamber registers with the outlet 56 in the sleeve 54 so that the oil is discharged into the chamber 36. If there is no slip, each passage 52 remains closed at one or both ends. Preferably, there are four chambers 52 in the body 51, and in order to provide for greater coolant flow in view of the dimensional restrictions imposed by the location of the metering device, two metering devices of the character illustrated in Figure 2 are provided, connected hydraulically in parallel.

Referring now to Figure 1, it will be seen that the body 51 is integral with a web 57 and a flange 58 fitted within the clutch drum 16. The web 57 bears against shoulders 59 within the drum 16 and is retained by a snap ring 61. The outer race of the bearing 41 is mounted within the flange 58. The body 51 thus turns with the drum 16, and is formed with a flange at its inner diameter which rotates on the coolant tube 34. The tube 34 is constrained to rotate with the output shaft 11 by a pin 63 extending into the tube and mounted in a ring 64 fitted within the reduced portion 39 of the shaft 11. The ring 64 is caused to rotate with the shaft 11 by a pin 66 mounted in the shaft and extending into a keyway in the ring 64. The sleeve 54 is integral with an annular body 71 formed with radial passages 72 identical with the passages 52 of the body 51. The body 71 is brazed at 70 to the end of the tube 34 so that the body 71 and sleeve 54 rotate with the tube 34 and output shaft 11. As will be apparent, fluid flow through the chambers 52 of the body 51 is controlled by the sleeves 34 and 54 acting as valves so that each chamber 52 is filled and emptied each time the driving member slips one revolution with respect to the driven member.

The second metering device, which is similar to that previously described, comprises the body 71, an inner valve sleeve 74, and an outer valve sleeve 75. These sleeves are integral with a disk 76 and are journaled on the body 71 for rotation relative thereto. A pin 77 pressed into the fitting 31 and received in a notch in the disk 76 causes the sleeves 74 and 75 to rotate with the input shaft 10. A valve port 78 is formed in the sleeve 74 and a port 79 in the sleeve 75. Fluid discharged from the end of the tube 34 enters the chambers in the body 71 through the ports 78 and is discharged through the ports 79 in the same manner as previously described.

Fig. 3 shows a form of clutch plate as disclosed in the previously mentioned applications of Peterson and Schnepel providing passages for flow of coolant.

The driving clutch plate 19 comprises a disk 180 with spline teeth 181 on its inner margin for engagement with the splines 17 of the drum 16. The disk has on both sides a facing 182 with a large number of spiral grooves 183 dividing the surface into a number of spiral lands 184 which constitute the friction surfaces. With the driving clutch plates thus providing the passages 183 for coolant, the driven clutch plates preferably have plane faces.

Cooling fluid may be supplied to the passage 34 from any suitable source, such for example as a pump driven from the input or output shaft of the clutch, or both, so that fluid is available whenever the clutch is to be engaged or disengaged. A valve may be provided to shut off the supply of coolant when the input or output shaft is turning and the clutch is to be left disengaged. However, such a valve is not necessary. In the operation of the clutch, it is sufficient that fluid be available through the tube 34 whenever the clutch is to be cooled. Fluid will flow through the metering device as long as the clutch is not fully engaged, and the flow will be terminated when the slip ceases. It may not be necessary in some cases to cool the clutch during disengagement; however, if fluid is supplied to the conduit 34, the coolant will begin to flow through the metering device to the clutch as soon as the clutch plates begin to slip during disengagement.

Due to the radially outward flow through the chambers 52 and 72, centrifugal force aids the flow of oil through the metering device. Centrifugal force also acts to force the fluid from the metering device through the clutch.

While the oil reduces heating and damage to some extent by lubricating the plates, its principal role is to carry heat away. For this reason, oil is supplied in a quantity greatly in excess of that which would be sufficient for lubricating the clutch plates.

The metering principle of the invention is applicable, of course, to controlling the supply of any fluid which acts to reduce heating or other damaging effects in any manner during slipping of the clutch.

It will be appreciated by those skilled in the art that the principles of the invention may be applied to the cooling of clutches of various types and that metering devices of various types may be employed. The particular embodiment described in detail is illustrative of the principles of the invention, which may be embodied in various forms by the exercise of skill in the art.

I claim:

1. A friction clutch comprising, in combination, a driving member including an annular clutch plate, a driven member including an annular clutch plate, means for engaging and disengaging the clutch plates; a fluid metering device located radially inwardly of the clutch plates comprising a body formed with passages therethrough rotatable with one of the members and two valve parts slidingly engaging the surface of the body rotatable with the other member, the parts being formed with circumferentially displaced ports successively registering with the said passages during relative rotation of the members; and means for supplying fluid to the body by way of one of the valve parts; the fluid escaping from the body by way of the other valve part and flowing to the clutch plates.

2. A friction clutch comprising, in combination, a driving member, a driven member, means for engaging and disengaging the members; a fluid metering device comprising an annular body formed with radial passages rotatable with one of the members and two sleeves engaging the inner and outer surfaces of the body rotatable with the other member, the sleeves being formed with circumferentially displaced ports successively registering with the said passages during relative rotation of the members; means for supplying fluid to the body by way of the inner sleeve; and means for directing the fluid escaping from the body by way of the outer sleeve to the clutch members.

3. A friction clutch comprising, in combination, a driving member including an annular clutch plate, a driven member including an annular clutch plate, means for engaging and disengaging the clutch plates; a fluid metering device located radially inwardly of the clutch plates comprising an annular body formed with radial passages rotatable with one of the members and two sleeves engaging the inner and outer surfaces of the body rotatable with the other member, the sleeves being formed with circumferentially displaced ports successively registering with the said passages during relative rotation of the members; and means for supplying fluid to the body by way of the inner sleeve; the fluid escaping from the body by way of the outer sleeve flowing to the clutch plates.

4. A clutch comprising an inner drum, an outer drum, a first set of clutch plates splined to the inner drum, a second set of clutch plates splined to the outer drum, the plates of the two sets being interleaved, means for forcing the clutch plates into frictional engagement, the inner drum being formed with longitudinally and circumferentially spaced passages for conduction of fluid to the clutch plates, one face of each pair of engaging clutch faces being formed for conduction of fluid, and the outer drum being provided with peripheral fluid outlets, a fluid metering device within the inner drum including a part connected to each clutch drum for rotation therewith, the metering device being adapted to deliver fluid for cooling the clutch at a rate proportional to the rate of relative rotation of the said parts, and means for supplying fluid to the metering device.

5. A clutch comprising an inner drum, an outer drum, a first set of clutch plates splined to the inner drum, a second set of clutch plates splined to the outer drum, the plates of the two sets being interleaved, means for forcing the clutch plates into frictional engagement, the inner drum being formed with longitudinally and circumferentially spaced passages for conduction of fluid to the clutch plates, one face of each pair of engaging clutch faces being formed for conduction of fluid, and the outer drum being provided with peripheral fluid outlets, a fluid metering device within the inner drum including a part connected to each clutch drum for rotation therewith, the metering device being adapted to deliver fluid for cooling the clutch at a rate dependent upon the rate of relative rotation of the said parts, and means for supplying fluid to the metering device.

6. A clutch comprising an inner drum, an outer drum, a first set of clutch plates splined to the inner drum, a second set of clutch plates splined to the outer drum, the plates of the two sets being interleaved, means for forcing the clutch plates into frictional engagement, the inner drum being formed with longitudinally and circumferentially spaced passages for conduction of fluid to the clutch plates, one face of each pair of engaging clutch faces being formed for conduction of fluid, and the outer drum being provided with peripheral fluid outlets, a fluid metering device within the inner drum including a part connected to each clutch drum for rotation therewith, the metering device being adapted to deliver fluid for cooling the clutch during relative rotation of the said parts and to terminate the flow when relative movement ceases, and means for supplying fluid to the metering device.

7. A clutch comprising an inner drum, an outer drum, a first set of clutch plates splined to the inner drum, a second set of clutch plates splined to the outer drum, the plates of the two sets being interleaved, means for forcing the clutch plates into frictional engagement, the inner drum being formed with longitudinally and circumferentially spaced passages for conduction of fluid to the clutch plates, one face of each pair of engaging clutch faces being formed for conduction of fluid, and the outer drum being provided with peripheral fluid outlets, a fluid metering device within the inner drum including a part connected to each clutch drum for rotation therewith, one part defining fluid passages and the other part constituting means for alternately opening each end of the passages, and means for supplying fluid to the metering device.

8. A friction clutch comprising, in combination, a driving member, a driven member, means for effecting frictional engagement between the driving and driven members, at least one of the said members being formed to define passages for circulation of fluid between and from between the members, means for supplying a fluid to the clutch for circulation through the said passages, and a metering device for metering the fluid so supplied in accordance with the slip between the members comprising a first metering part rotatable with one of the said members and a second metering part rotatable with the other of said members, one of the metering parts being formed with a fluid chamber with an inlet and an outlet and the other metering part including means for alternately closing the outlet with the inlet open and closing the inlet with the outlet open, the means for supplying fluid being connected to the inlet, and the outlet discharging to the clutch.

9. A friction clutch comprising, in combination, a driving member, a driven member, means for engaging and disengaging the members; a fluid metering device comprising a body formed with passages therethrough rotatable with one of the members and parts obturating both ends of the passages rotatable with the other member, the parts being formed with circumferentially spaced ports alternately and successively registering with each end of the said passages so as to open alternate ends of each passage alternately and successively and so that the parts close an end of each passage at all times during relative rotation of the members; and means for supplying fluid to the metering device; the fluid escaping from the metering device flowing to the clutch plates.

References Cited in the file of this patent

UNITED STATES PATENTS

| | | |
|---|---|---|
| 686,960 | Truitt | Nov. 19, 1901 |
| 2,178,050 | Peterson | Oct. 31, 1939 |
| 2,386,220 | Lawler et al. | Oct. 9, 1945 |
| 2,407,699 | Hill | Sept. 17, 1946 |
| 2,516,544 | Breeze | July 25, 1950 |
| 2,642,971 | Hagenbook | June 23, 1953 |

FOREIGN PATENTS

| | | |
|---|---|---|
| 150,301 | Great Britain | Oct. 7, 1920 |
| 331,735 | Germany | Mar. 22, 1933 |